(12) United States Patent
Anthony

(10) Patent No.: US 7,810,197 B1
(45) Date of Patent: Oct. 12, 2010

(54) ILLUMINATED CABLE RAMP

(76) Inventor: Curtis Anthony, 3817 Cooper St., Huntsville, AL (US) 35801

( * ) Notice: Subject to any disclaimer, the term of this patent is extended or adjusted under 35 U.S.C. 154(b) by 0 days.

(21) Appl. No.: 12/180,371

(22) Filed: Jul. 25, 2008

Related U.S. Application Data

(60) Provisional application No. 60/961,885, filed on Jul. 25, 2007.

(51) Int. Cl.
*H02G 3/30* (2006.01)
*F16L 57/00* (2006.01)

(52) U.S. Cl. .......................... 14/69.5; 174/68.1; 174/97

(58) Field of Classification Search ................ 14/69.5; 174/50, 68.1, 135, 97
See application file for complete search history.

(56) References Cited

U.S. PATENT DOCUMENTS

| | | | | |
|---|---|---|---|---|
| 3,965,967 A | * | 6/1976 | Jentzsch et al. | 104/275 |
| 5,095,822 A | * | 3/1992 | Martin | 104/275 |
| 5,267,367 A | * | 12/1993 | Wegmann, Jr. | 14/69.5 |
| 5,724,909 A | | 3/1998 | Pitman et al. | |
| 5,777,266 A | * | 7/1998 | Herman et al. | 174/68.1 |
| D412,490 S | * | 8/1999 | Henry | D13/155 |
| D437,832 S | * | 2/2001 | Henry | D13/155 |
| 6,202,565 B1 | * | 3/2001 | Henry | 104/275 |
| 6,270,236 B1 | | 8/2001 | Brussog | |
| 6,481,036 B1 | * | 11/2002 | Duvall | 14/69.5 |
| 6,499,410 B1 | | 12/2002 | Berardi | |
| 6,747,212 B1 | * | 6/2004 | Henry | 174/101 |
| 7,309,836 B2 | * | 12/2007 | Lubanski | 174/101 |
| 7,332,672 B2 | | 2/2008 | Henry | |
| 7,385,139 B2 | * | 6/2008 | Lubanski | 174/97 |
| 7,394,025 B1 | * | 7/2008 | Wong | 174/135 |
| 2009/0020305 A1 | * | 1/2009 | Fidler | 174/50 |

OTHER PUBLICATIONS

Cable Organizer. com, "Yellow Jacket Cable Protector—Extra Heavy Duty Protection," http://cableorganizer.com/cable-protector-yjack/, pp. 1-5, Jul. 25, 2008.

* cited by examiner

*Primary Examiner*—Raymond W Addie
(74) *Attorney, Agent, or Firm*—Lanier Ford Shaver & Payne, P.C.; Jon E. Holland

(57) ABSTRACT

Cable ramps are illuminated in an effort to increase awareness of the ramp thereby decreasing the risk of a person tripping or entanglement with the ramp. Light sources (e.g., light emitting diodes) are placed at various locations on a cable ramp and illuminate the cable ramp helping users to see it, particularly in dark conditions. In one exemplary embodiment, the cable ramp has a movable lid, and at least one light source is positioned such that light emitted from the light source passes through the movable lid.

21 Claims, 2 Drawing Sheets

ILLUMINATED CABLE RAMP

CROSS REFERENCE TO RELATED APPLICATION

This application claims priority to U.S. Provisional Patent Application No. 60/961,885, entitled "illuminated Cable Ramp," and filed on Jul. 25, 2007, which is incorporated herein by reference.

RELATED ART

Cable ramps are typically used to cover electrical cables to prevent people from accidentally tripping over such cables as well as to facilitate movement of various objects over the cables. Such cable ramps are widely used in theatrical productions where many different cables may be employed to provide power and/or control for various devices, such as lights, used during a theatrical performance (e.g., a play, a musical performance, etc.).

A conventional cable ramp typically has a plurality of channels into which one or more cables may be positioned. Access to the channels is often provided by a rotatable lid that can be rotated away from the channels so that a user can place one or more cables in the exposed channels. The lid may then be rotated in an opposite direction so that the lid covers the cables that have been positioned in the ramp channels. Accordingly, the portions of the cables within ramp are unexposed preventing people from tripping over such cable portions and/or preventing objects from being entangled with such cable portions. Although a single cable ramp does not typically cover the entire length of a cable, a cable ramp may be placed at problematic locations, such as locations where people are likely to walk (e.g., across a path or aisle) or objects are likely to pass, in an effort to increase the ramp's effectiveness at preventing tripping or entanglement.

Although a cable ramp decreases the risk of tripping or entanglement at its location of use, it does not eliminate the risk entirely. Indeed, it is possible for a person to accidentally trip over the cable ramp particularly if he or she does not see the ramp.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to cable ramps that are illuminated in an effort to increase awareness of the ramp thereby decreasing the risk of a person tripping or entanglement with the ramp. Light sources (e.g., light emitting diodes) are placed at various locations on a cable ramp and illuminate the cable ramp helping users to see it, particularly in dark conditions. In one exemplary embodiment, the cable ramp has a movable lid, and at least one light source is positioned such that light emitted from the light source passes through the movable lid.

Figure 1:
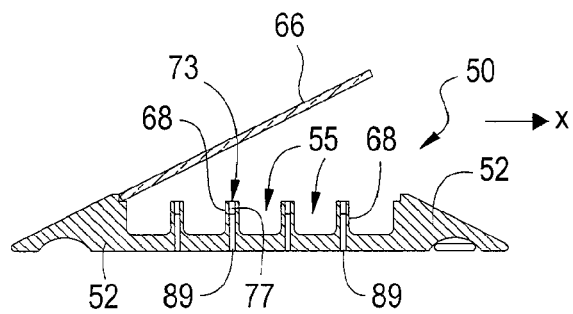
FIG. 1 depicts a side view of an exemplary embodiment of an illuminated cable ramp having a lid in a partially opened position.
Figure 4:
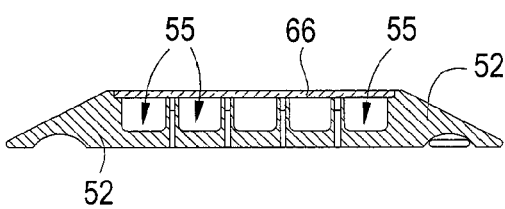
FIG. 4 depicts a side view of a cable ramp, such as is depicted in FIG. 1, with the lid in a closed position.
Figure 2:
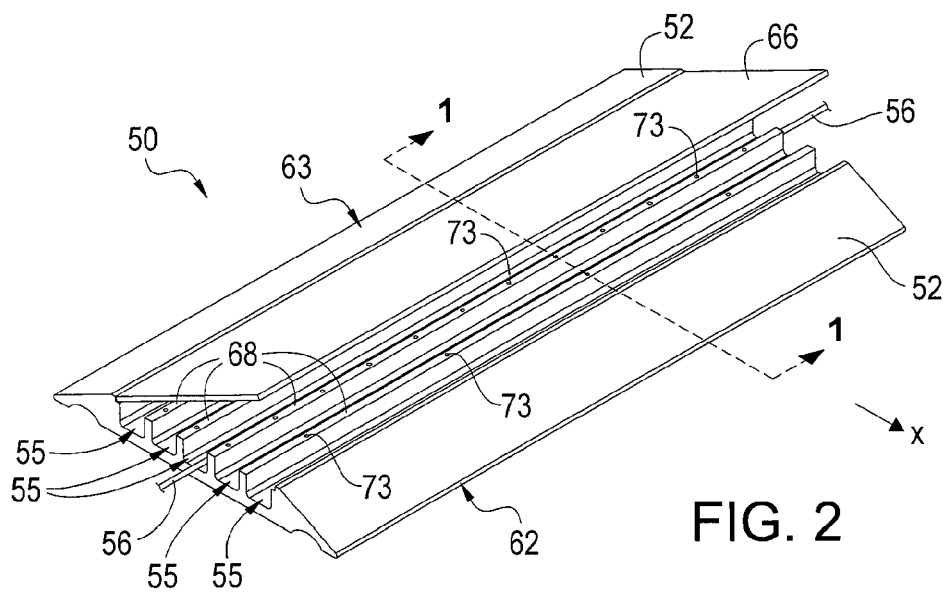
FIG. 2 depicts a three-dimensional view of a cable ramp, such as is depicted in FIG. 1.
Figure 3:
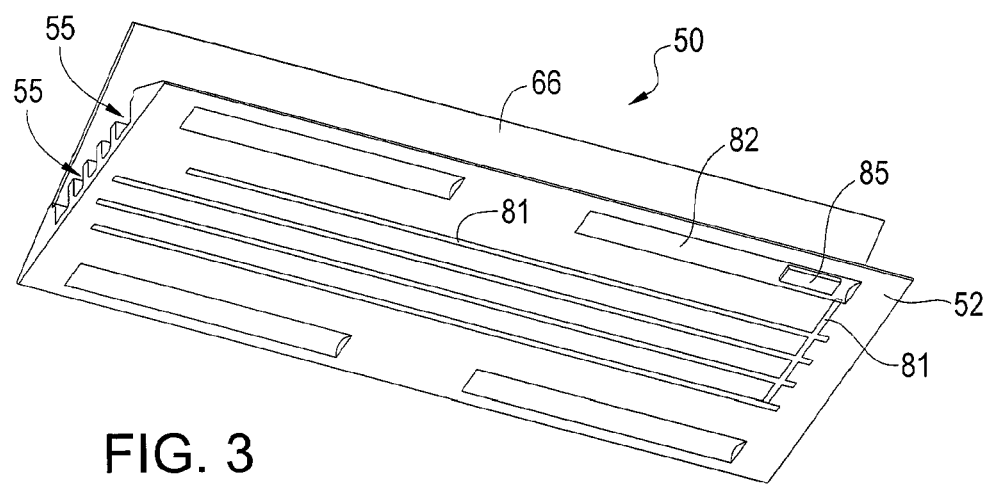
FIG. 3 depicts a three-dimensional view of a cable ramp, such as is depicted in FIG. 1.

FIGS. 1-3 depict a cable ramp 50 in accordance with an exemplary embodiment of the present disclosure. The ramp comprises a base 52 having a plurality of channels 55 separated by ridges 68. As shown by FIG. 2, one or more cables 56 may be positioned within each channel 55. Opposite ends 62, 63 of the base 52 are sloped in order to form an incline at each end 62, 63. Further, a lid 66 is rotatably mounted on the base 52. When in a closed position, as shown by FIG. 4, the lid 66 covers the channels 55 and, therefore, any cables 56 positioned in the channels 55. In the exemplary embodiment shown by FIG. 4, the lid 66 is supported by and rests on the ridges 68 of the base 52 forming the channels 55. In other embodiments, the lid 66 may contact other portions of the base 52 and may be mounted differently. For example, it is possible for the lid 66 to rest on the base such that, when desired, the lid 66 can be entirely removed from the base 52 by hand or otherwise to expose the channels 55.

A user can move the lid 66 to an open position by grabbing the lid 66 and rotating it away from the channels 55 thereby exposing the channels 55. FIG. 2 shows the ramp 50 after the lid 66 has been partially opened. Relative to FIG. 2, the lid 66 can be further rotated away from the channels 55 to expose the channels 55 to a greater extent. When the lid 66 is opened, one or more cables 56 can be easily placed in the channels 55 by hand or otherwise.

Once one or more cables 56 are placed in the channels 55, the lid 66 is preferably closed by rotating the lid 66 toward the channels 55 until the lid 66 contacts and rests upon the base ridges 68. At this point, the ramp 50 houses at least a portion of each cable 56 that has been inserted into any of the channels 55. Thus, a person or object walking or otherwise passing over the ramp will not likely become entangled with or trip over the cable portions housed by the ramp 50. Further, if an object is rolled by wheels over the ramp 50 in the x-direction or is slid over the ramp 50 in the x-direction, the wedge shape formed at each end 62, 63 facilitates movement of the object over the ramp 50. Moreover, the outer surface formed by the ends 62, 63 and the lid 66 is smooth in order to reduce the likelihood of tripping or other disruption of the motion of a person or object passing over the ramp 50. Note that the structural configuration of the ramp 50 shown by FIGS. 1-4 is described herein for exemplary purposes, and it is possible for the ramp 50 to have other structural configurations in other embodiments. Indeed, just about any conventional ramp can be retrofitted with light sources in order to effectuate an illuminated ramp in accordance with the present disclosure.

Holes 73 are formed in the base ridges 68. Mounted within each hole 73 is a light source 77 (FIG. 1). In one exemplary embodiment, each light source 77 is a light emitting diode LED assembly comprising an LED. Each light source 77 is inserted into its respective hole 73 and is held in place by frictional forces between the LED assembly and the ridge 68 in which the hole 73 is formed. In other embodiments, other techniques for mounting the light sources 77 are possible, and locations other than those described herein for the light sources 77 are possible. For example, it is possible for the light sources 77 to be mounted on the lid 66 rather than base 52 or to be mounted on the inclined surfaces of the base 52, as described by U.S. Pat. No. 6,499,410, which is incorporated herein by reference.

Each of the light sources 77 is electrically coupled to at least one power source, which provides electrical power to such light source 77. In one exemplary embodiment, as shown by FIG. 3, the bottom surface of the base 52 has channels 81 through which conductive wires pass. Further, as shown by FIG. 1, the ridges 68 have channels 89 extending from the channels 81 to allow the conductive wires to reach the light sources 77. In addition, referring to FIG. 3, the bottom surface of the base 52 also has a channel 82 in which a power source 85, such as a battery, resides. Moreover, electrical wires run through the channels 81 and 89 coupling the power source 85 to each of the light sources 77. The wires may be coupled to the power source 85 through a switch (not shown), which can be used to turn on and off the light sources 77, as may be desired. Such a switch may be mounted on the base 52 at any desired location.

In the exemplary embodiment shown by FIGS. 1-4, the light sources 77 are not exposed when the lid 66 is in a closed position. When the light sources 77 are activated (e.g., receiving electrical power from the power source 85), light from the light sources 77 passes through the lid 66 so that at least some of the light emitted by the light sources 77 can be seen by people approaching the ramp 50. Such light may draw a person's attention to the ramp 50 thereby increasing the chances that the person will see the ramp 50 before arriving at it. Accordingly, the likelihood that the person will trip over the ramp 50 due in part to the person's failure to see or notice the ramp 50 is reduced. Illumination of the ramp 50 by the light sources 77 can be particularly advantageous when the ramp 50 is placed in dark conditions, but the light sources 77 may nevertheless be beneficial when the ramp 50 is well lit by one or more external light sources.

Figure 5:
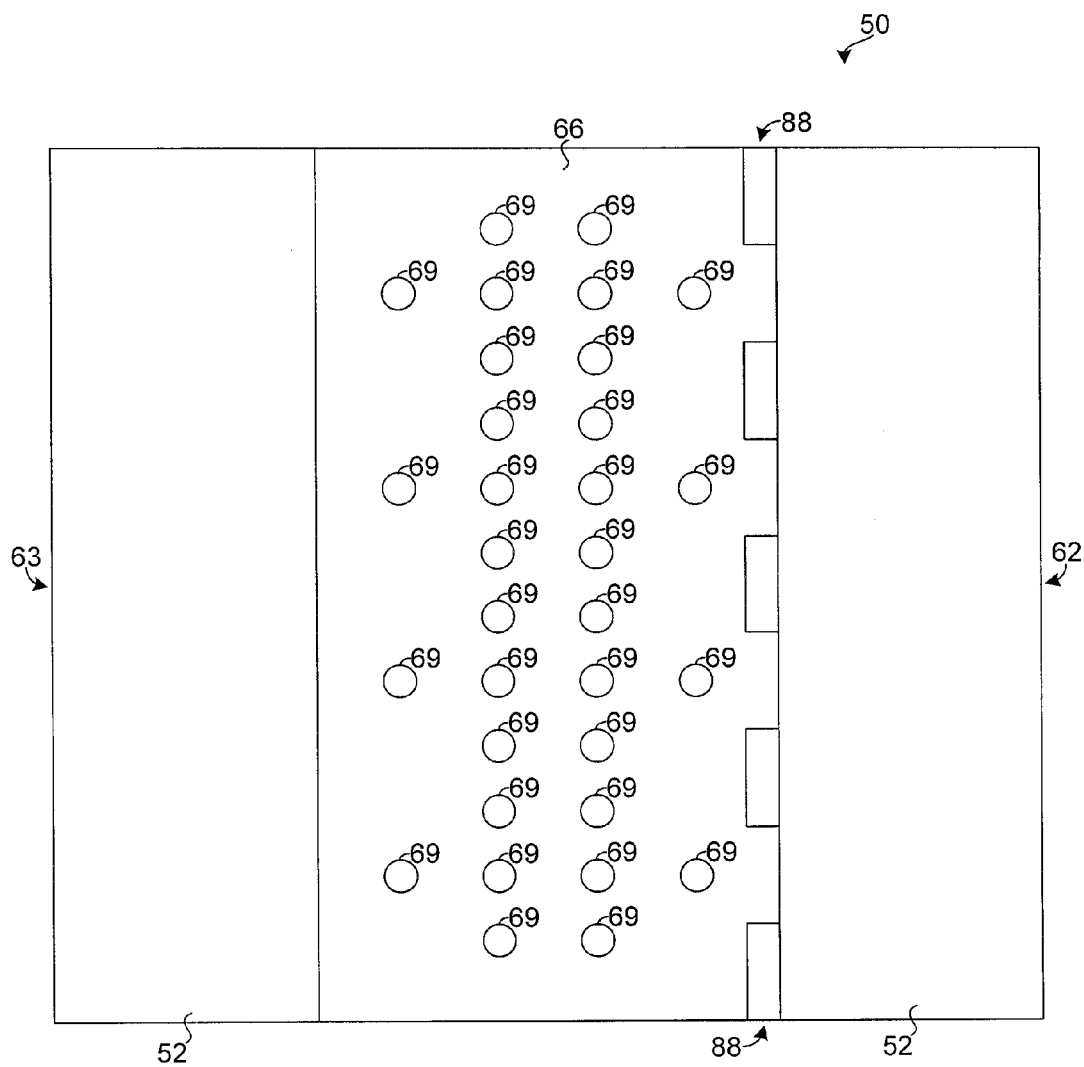
FIG. 5 depicts a top view of a cable ramp, such as is depicted in FIG. 4.

FIG. 5 depicts a top view of the cable ramp 50 with the lid 66 in a closed position. The lid 66 is composed of a translucent material that allows light from the light sources 77 covered by the lid 66 to pass through such lid 66. In the exemplary embodiment shown by FIG. 5, the lid 66 has several bright spots 69. Each bright spot 69 is an area of high brightness relative to other portions of the lid 66 resulting from the light emitted by at least one light source 77. In this regard, each bright spot 69 is a region of the lid 66 through which light emitted directly from a corresponding light source 77 passes. In the exemplary embodiment shown by FIG. 5, the bright spots 69 appear in rows and columns, but other patterns are possible depending on the positioning of the light sources 77. The bright spots 69 are highly noticeable to a person in view of the ramp 50, particularly in dark ambient conditions.

In the exemplary embodiment shown by FIG. 5, the lid 66 has a hinge 88 at one end about which the lid 66 rotates. In addition, the ramp 50 has four ridges 68 in which light sources 77 are recessed. The inner two ridges 68 with recessed light sources 77 have twelve light sources 77 forming twelve bright spots 69. The other two ridges 68, referred to as "outer ridges," with recessed light sources 77 have four light sources 77 forming four bright spots 69. The light sources 77 of the outer two ridges 68 are spaced a greater distance from one another compared to the spacing for the light sources 77 of the interior two ridges. In other embodiments, other numbers of light sources 77 for any of the ridges 68 and other spacing are possible.

In one exemplary embodiment, the cable ramp 50 is manufactured by recessing LEDs as the light sources 77 in the ridges 68 of a cable ramp sold by Peterson Systems International under the model number YJ5-125 (which has five channels 55) and the name Yellow Jacket®. Such a cable ramp 50, including both the base 52 and the lid 66, is composed of a polyurethane (durathane), which provides good mechanical support. The lid 66 of such a cable ramp 50 is typically colored yellow and the base 52 is typically colored black. However, the lid 66 is sufficiently translucent to allow light from the light sources 77 to pass through the lid 66. Other types of cable ramps may be employed in other embodiments.

The light sources 77 may be arranged in any desired pattern, as well as any color or pattern of colors. Further, the intensity of the light sources 77 may depend on the transparency of the lid 66 and/or the expected lighting conditions in which the ramp 50 is to be used. A control system, such as one or more switches, may be used to adjust the lighting characteristics (e.g., color and/or intensity) of the light sources 77. Such a control system may be mounted on the base 52 or other portion of the ramp 50. In addition, one or more holes (not shown) may be formed in the lid 66 to allow light from the light sources 77 to escape through the holes. In such an embodiment, the lid 66 may be composed of an opaque material since light from the light sources 77 can pass through the holes in the lid 66. As described above, the light sources 77 may be mounted at various positions on the ramp 50, such as on the outer surface of the lid 66 or base 52. Preferably, the light sources 77 are integral with ramp 50 to facilitate movement of the ramp 50 to new locations. Further, recessing the light sources 77 and/or covering the light sources 77 with the lid 66 help to prevent contact between the light sources 77 and objects or people passing over the ramp 50, thereby helping to prevent damage to the light sources 77, as well as helping to prevent the light sources 77 from interfering with movement of the objects or persons.

The invention claimed is:

1. A cable ramp, comprising:

a base having a channel and forming at least one incline;

a movable lid positioned on the base, the lid having a bottom surface and a top surface opposite of the bottom surface, the bottom surface facing the base when the lid is in a closed position, wherein the lid is composed of a translucent material; and a light source mounted on the base and positioned such that light emitted from the light source enters the lid through the bottom surface, passes through the translucent material of the lid, and exits the lid through the top surface, wherein the light source is positioned within a hole in a surface of the base, and wherein the surface contacts the lid.

2. A cable ramp, comprising:

a base a plurality of channels and a ridge separating two of the channels, the base forming at least one incline;

a movable lid positioned on the base, the lid having a bottom surface and a top surface opposite of the bottom surface, the bottom surface facing the base when the lid is in a closed position, wherein the lid is composed of a translucent material; and a light source mounted on the base and positioned such that light emitted from the light source enters the lid through the bottom surface, passes through the translucent material of the lid, and exits the lid through the top surface, wherein the light source is mounted on the ridge.

3. The cable ramp of claim 2, wherein the light source is recessed into the ridge.

4. The cable ramp of claim 2, wherein the lid contacts the ridge.

5. The cable ramp of claim 4, wherein the lid is rotatably mounted on the base.

6. A method of illuminating a cable ramp, comprising the steps of:

positioning an electrical cable within a channel of a base of the cable ramp, positioning a lid on the base thereby covering the electrical cable, wherein the lid is composed of a translucent material;

moving the lid relative to the base; and activating a light source mounted on the base such that light from the light source passes through the lid, wherein the light source is stationary relative to the base during the moving step wherein the activating is performed such that the light passes through the translucent material, wherein the light source is positioned within a hole in a surface of the base, and wherein the positioning the lid step comprises the step of contacting the surface with the lid.

7. A method of illuminating a cable ramp, comprising the steps of:

positioning an electrical cable within a channel of a base of the cable ramp, positioning a lid on the base thereby covering the electrical cable, wherein the lid is composed of a translucent material; wherein the base has a plurality of channels and a ridge separating;

moving the lid relative to the base; and activating a light source mounted on the base such that light from the light source passes through the lid, wherein the light source is stationary relative to the base during the moving step, wherein the activating is performed such that the light passes through the translucent material, and wherein the light source is mounted on the ridge.

8. The method of claim 7, wherein the light source is recessed into the ridge.

9. The method of claim 7, wherein the positioning the lid step comprises the step of contacting the ridge with the lid.

10. The method of claim 9, wherein the positioning the lid step comprises the step of rotating the lid.

11. A cable ramp, comprising:

a base having a plurality of channels and a ridge separating two of the channels, the base forming at least one incline;

a movable lid positioned on the base, wherein the lid is composed of a translucent material; and a light source mounted on the base such that the light source is stationary relative to the base while the movable lid is moving relative to the base, wherein the light source is positioned such that light emitted from the light source passes through the lid, wherein the light source is recessed into the ridge.

12. A cable ramp, comprising:

a base having a plurality of channels and forming at least one incline, two of the channels separated by a ridge of the base;

a movable lid positioned on the base, wherein a surface of the ridge contacts the movable lid when the movable lid is moved to a closed position; and a light source mounted on the base such that the light source is stationary relative to the base while the movable lid is moving relative to the base, wherein the light source is positioned such that light emitted from the light source passes through the lid, wherein the light source is positioned in a hole of the surface.

13. The cable ramp of claim 12, wherein the base has a first side and a second side that is opposite of the first side, wherein the plurality of channels are in the first side and wherein a power source is mounted on the second side, the second side having at least one channel, wherein a conductive wire extends from the power source to the light source through the at least one channel.

14. The cable ramp of claim 13, wherein the ridge has a passageway that extends to the at least one channel of the second side, and wherein the conductive wire passes through the passageway of the ridge.

15. A cable ramp comprising:

a base forming at least one incline;

a movable lid positioned on the base, the lid having a bottom surface and a top surface opposite of the bottom surface, the bottom surface facing the base when the lid is in a closed position, wherein the lid is composed of a translucent material; and a light source mounted and positioned such that light emitted from the light source enters the lid through the bottom surface, passes through the translucent material of the lid, and exits the lid through the top surface, wherein the light source is positioned such that the lid covers the light source when the lid is in the closed position.

16. The cable ramp of claim 2, wherein the ridge contacts the movable lid when the lid is in the closed position.

17. The cable ramp of claim 16, wherein the base has a first side and a second side that is opposite of the first side, wherein the plurality of channels are in the first side and wherein a power source is mounted on the second side, the second side having at least one channel, wherein a conductive wire extends from the power source to the light source through the at least one channel.

18. The cable ramp of claim 17, wherein the ridge has a passageway that extends to the at least one channel of the second side, and wherein the conductive wire passes through the passageway of the ridge.

19. A method of illuminating a cable ramp, comprising the steps of:

positioning an electrical cable within a channel of a base of the cable ramp, wherein the channel is separated from another channel of the base by a ridge of the base;

positioning a lid on the base thereby covering the electrical cable, wherein the lid is composed of a translucent material;

moving the lid relative to the base such that the lid contacts the ridge; and activating a light source mounted on the base such that light from the light source passes through the lid, wherein the light source is stationary relative to the base during the moving step, wherein the activating is performed such that the light passes through the translucent material, wherein the light source is recessed into the ridge.

20. The method of claim 19, further comprising the step of powering the light source via a power source that is mounted on a side of the base, wherein the side has at least one channel, and wherein a conductive wire extends from the power source to the light source through the at least one channel.

21. The method of claim 20, wherein the ridge has a passageway that extends to the at least one channel, and wherein the conductive wire passes through the passageway of the ridge.

* * * * *